UNITED STATES PATENT OFFICE.

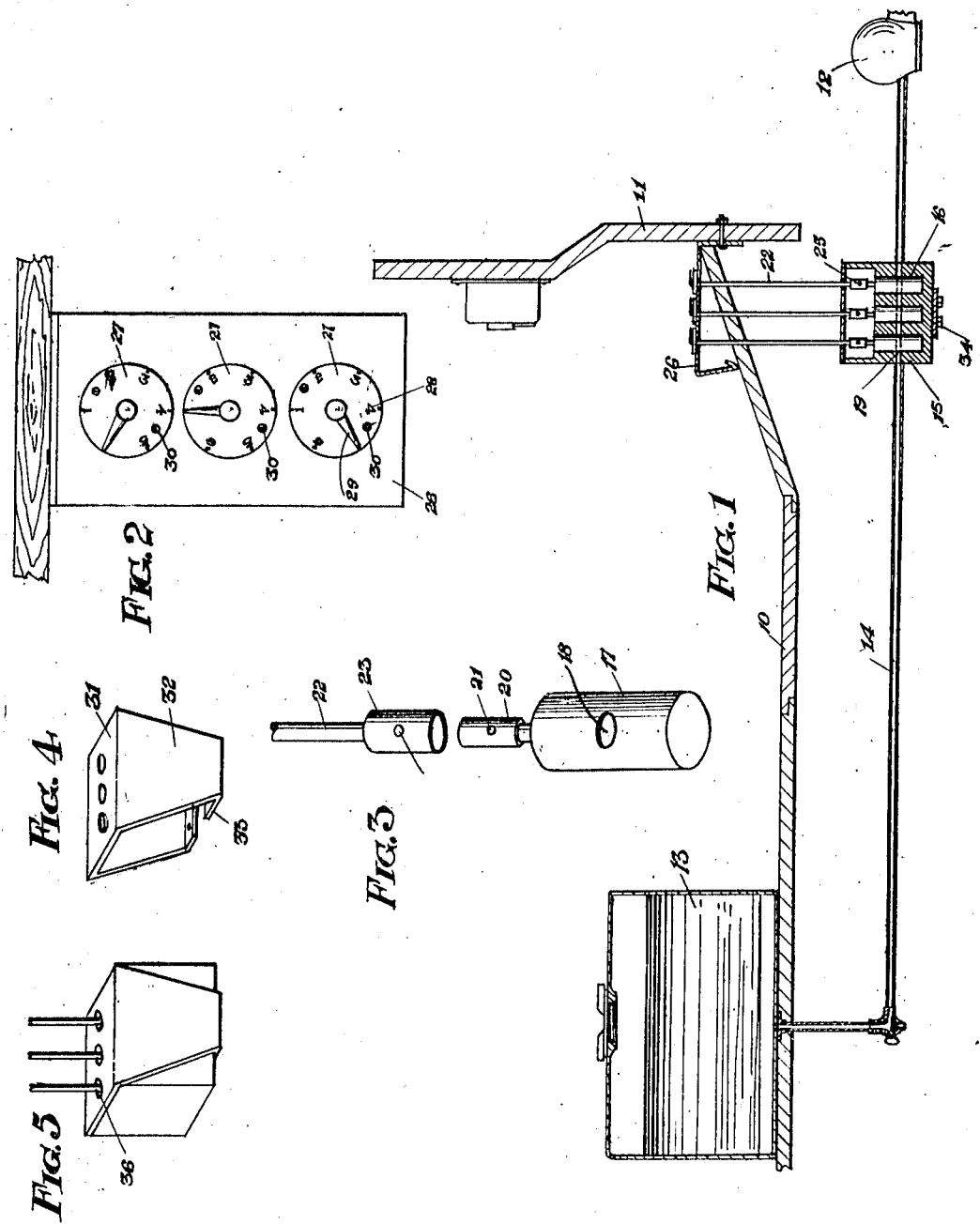

FRANK VOGELZANG, OF ROCK VALLEY, IOWA.

LIQUID-FUEL-LOCK DEVICE.

1,316,986.  Specification of Letters Patent.  Patented Sept. 23, 1919.

Application filed January 17, 1919. Serial No. 271,744.

*To all whom it may concern:*

Be it known that I, FRANK VOGELZANG, a citizen of the United States, and resident of Rock Valley, in the county of Sioux and State of Iowa, have invented a certain new and useful Liquid-Fuel-Lock Device, of which the following is a specification.

The object of my invention is to provide a liquid fuel lock device particularly designed for use on motor cars for shutting off the fuel supply in such manner as to prevent theft of the car.

More particularly it is my object to provide a device of the kind mentioned, of simple, inexpensive and durable construction, which can be readily and easily mounted on a motor car as an attachment, and including a series of valves inclosed in a suitable casing and provided with stems and indicator fingers arranged adjacent to dials or the like, so that the valves may be adjusted for shutting off the fuel supply. In such a device the combination or valve arrangement necessary for opening the fuel passages can be discovered only by taking the entire device apart.

With these and other objects in view, my invention consists in the construction, arrangement and combination of the various parts of the device, whereby the objects contemplated are attained, as hereinafter more fully set forth, pointed out in my claim and illustrated in the accompanying drawings, in which;

Figure 1 shows a vertical, sectional view through the floor of a motor vehicle and through the casing of a device embodying my invention.

Fig. 2 shows a top or plan view of the dial plate.

Fig. 3 shows a detail, perspective view of one of the valves and the stem therefor.

Fig. 4 shows a perspective view of the cover for the valve casing, and

Fig. 5 shows a perspective view of the valve casing with the cover assembled thereon.

In the illustration of my invention shown in the accompanying drawings, I have used the reference numeral 10 to indicate generally the floor of a motor vehicle having the dash 11. Suitably located is the carbureter 12, and spaced therefrom at any suitable point, is the fuel supply tank 13. Leading from the fuel supply tank to the carbureter is a fuel pipe 14.

In the path of fuel travel is a valve casing 15 having a plurality of openings 16 for valves. In the present instance I have shown three of said valve openings. The walls of the casing 15 extend upwardly substantially beyond the upper ends of the valve casing openings 16, as clearly illustrated in Fig. 1.

Received in each valve opening 16 is a cylindrical valve 17, having an opening 18 extending through it. The walls of the casing 15 and the partitions between the openings 16 have alined passages 19. The outer ends of the passages 19 at the opposite sides of the casing 15 communicate with the fuel pipe 14 on opposite sides of said casing.

Each valve 17 has an upwardly extending stem 20 in which is an opening 21. There is provided for each valve an upwardly extending controlling stem or rod 22, having at its lower end a hollow cylindrical member 23 which is adapted to and does in the assembled device, receive one of the stems 20. Each of the members 23 is provided with an opening 24, adapted to register with the opening 21. A pin 25 is extended through each opening 24 and into the opening 21, for locking the rod 22 to the stem 20. The rods 22 extend upwardly through the floor 10 of the motor vehicle, and through a dial plate 26 which is suitably mounted on the machine.

On the dial plate 26 are three dials 27, each having a series of indicating characters 28. On the upper end of each rod 22 is an indicating finger 29. The dials 27 are detachably mounted on the plate 26 by means of screws 30 or the like.

It will be seen that the dials may be secured to the plate 26 in different positions, so that a great variety of combinations may be secured. The user of each motor vehicle equipped with my device may arrange his dials to suit himself, so that the combination for setting the valves to proper position for permitting the passage of fuel may be known only to the owner of the machine.

I provide a cover plate for the casing 15, comprising a top member 31, side members 32, and inwardly extending, opposite bottom flanges 33, which are secured to the bottom of the casing 15 by means of screws 34 or the like. The top portion 31 of the cover plate is provided with a series of openings 36 to permit the insertion of the rods 22, said openings being large enough to allow the passage of the members 23.

After the device has been assembled and installed on a machine, it will be seen that when the owner stops the machine and desires to shut off the fuel supply, he may turn any one of the indicating fingers 29 away from its position when the valve is in proper working position, and anyone attempting to tamper with the car would have great difficulty in moving the fingers to proper position for moving the valves to operative positions.

My device is of very simple and inexpensive construction, and can be mounted on practically any car with comparatively little work.

My device can be used for shutting off gasolene supply, and could not be manipulated for turning on the gasolene supply by anyone who did not know the combination, without taking the entire device apart, which would require considerable time and work.

It will thus be seen that my improved device furnishes practical insurance against theft of the car.

Some changes may be made in the construction and arrangement of the various parts of my device, without departing from the essential features and purposes of the invention, and it is my intention to cover by my claim any modified forms of structure or use of mechanical equivalents which may be reasonably included within their scope.

I claim as my invention:

In a device of the class described, a valve casing, having a plurality of valve openings; valves in said valve openings, said valves having upwardly projecting stems; means for fastening rods to said stems, said valve casing having upwardly projecting wall members forming an open space at the upper end of said casing, designed to hold the fastening means therein; a closure member having a plurality of openings for permitting said rods to extend through, said closure member having a pair of downwardly projecting side members; and inwardly extending flanges secured to said downwardly projecting members; and means for fastening said closure member in position for sealing said valve casing.

Des Moines, Iowa, November 21, 1918.

FRANK VOGELZANG.